W. BAGGULEY.
MACHINE FOR SLICING BREAD AND SPREADING BUTTER, JAM, MEAT PULP, OR OTHER LIKE SUBSTANCES THEREON.
APPLICATION FILED AUG. 16, 1913.
1,082,146.
Patented Dec. 23, 1913.
2 SHEETS—SHEET 1.
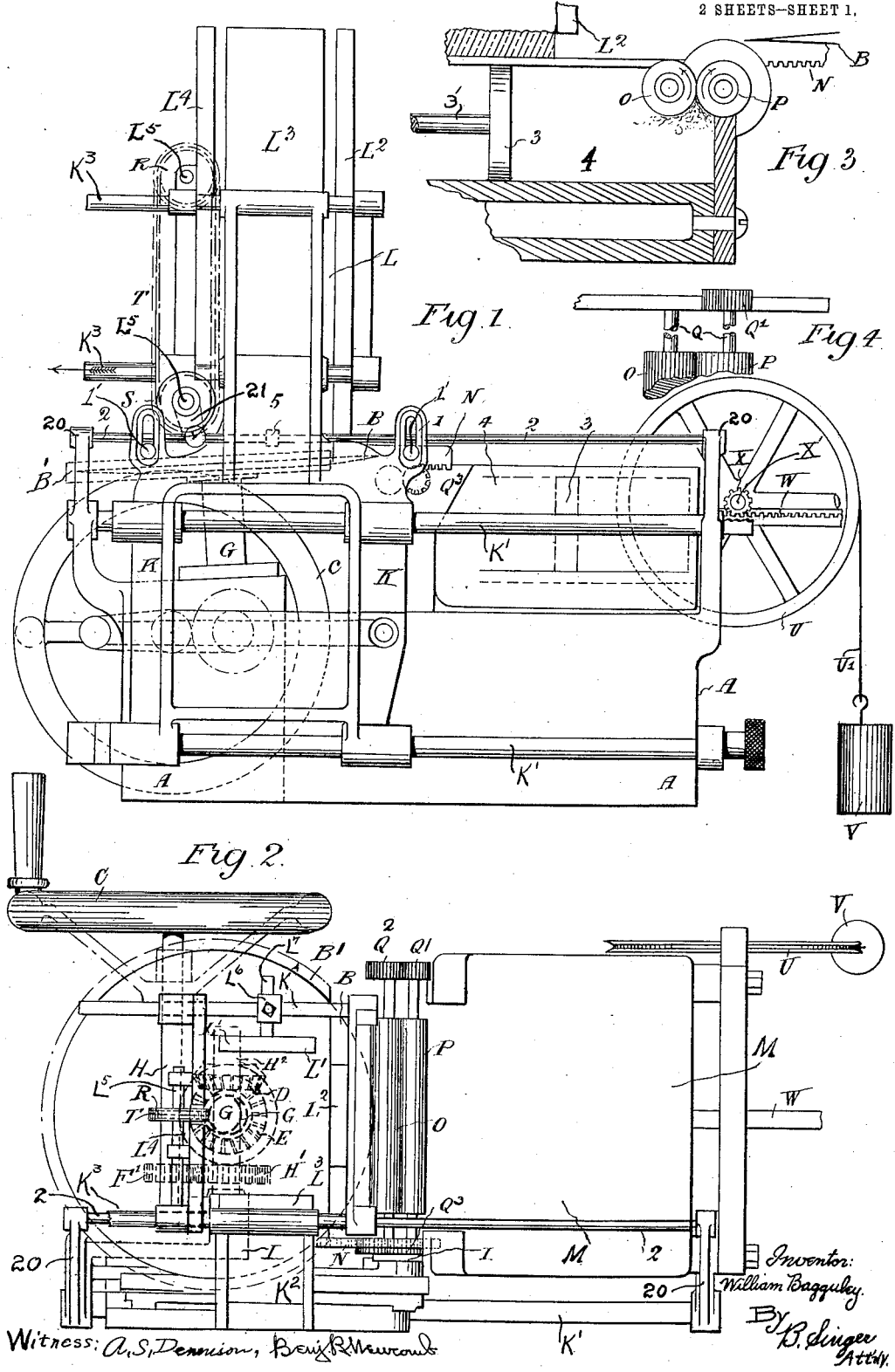

W. BAGGULEY.
MACHINE FOR SLICING BREAD AND SPREADING BUTTER, JAM, MEAT PULP, OR OTHER LIKE SUBSTANCES THEREON.
APPLICATION FILED AUG. 16, 1913.

1,082,146.

Patented Dec. 23, 1913.
2 SHEETS—SHEET 2.

Witnesses
John F. Hardie, Jr.
Marie E. Simpson

Inventor
William Bagguley
By B. Singer
Attorney

UNITED STATES PATENT OFFICE.

WILLIAM BAGGULEY, OF HOVERINGHAM, NOTTINGHAM, ENGLAND, ASSIGNOR TO BERNARD WITHERS DOWSON, OF NOTTINGHAM, ENGLAND.

MACHINE FOR SLICING BREAD AND SPREADING BUTTER, JAM, MEAT-PULP, OR OTHER LIKE SUBSTANCES THEREON.

1,082,146.  Specification of Letters Patent.  Patented Dec. 23, 1913.

Application filed August 16, 1913. Serial No. 785,140.

*To all whom it may concern:*

Be it known that I, WILLIAM BAGGULEY, of Hoveringham, Nottingham, England, have invented a certain new and useful Machine for Slicing Bread and Spreading Butter, Jam, Meat-Pulp, or other like Substances Thereon, of which the following is a specification.

This invention has for its object to provide a machine for slicing bread and spreading butter, jam, meat-pulp, or other like substances thereon.

In carrying out my invention I provide a suitable framework on which is carried a circular knife driven by a hand-wheel or other power. The hand-wheel gives power to a crank sliding a carriage backward or forward to the knife. Carried upon the slide or carriage is a hopper in which the bread to be cut is placed, and it is drawn down into the hopper by a chain or other convenient means. Under the hopper I provide a box or other receptacle into which the butter, jam, meat-pulp, or such like to be laid upon the cut slices of bread is held and by means of suitable revolving rollers, the butter, jam, meat-pulp, or such like, is conveyed to and spread on the bread.

In order that my invention may be properly understood and readily carried into effect, I have hereunto appended two sheets of drawings, of which—

Figure 6:
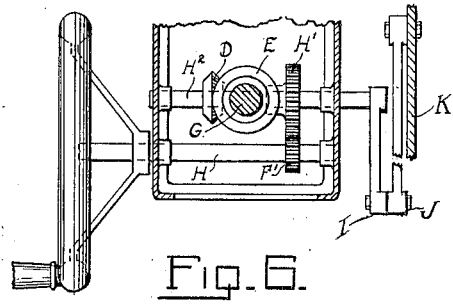
Figure 5:
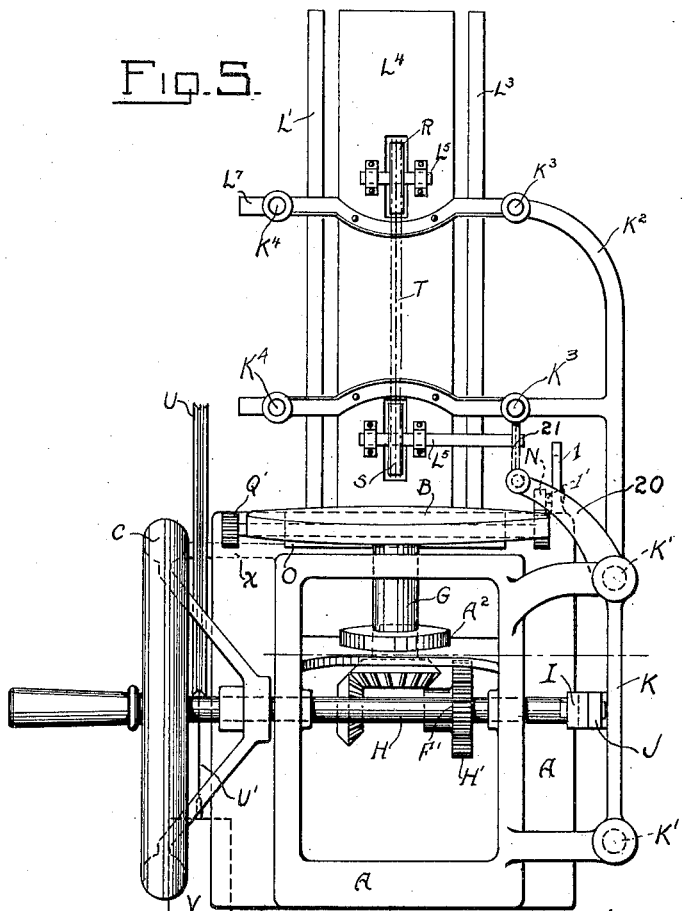

Figure 1 is a side elevation of the machine made in accordance with and embodying my invention. Fig. 2 is a plan of the same. Fig. 3 is a part elevation and part vertical section of part of the machine illustrated in Fig. 1 showing the reciprocating part of the mechanism having traveled past the knife with the spreading rollers, part of the cutting knife, and part of the bread hopper and bread drawn to an enlarged scale. Fig. 4 is a plan of part of the same also drawn to an enlarged scale. Fig. 5, is a front elevation of the machine as shown in Fig. 1. Fig. 6 is a sectional plan view of the driving mechanism.

In carrying out the objects of the invention there is provided a main frame A whereon is a journal $A^2$ having mounted therein a shaft G which caries a knife B protected by the guard B′ the shaft being slightly inclined from the vertical and the knife, as a result, slightly inclined from the horizontal. Journaled on the frame A is a shaft H whereon is mounted a hand wheel C. On the shaft H is a gear F′ which meshes with a gear H′ mounted on a shaft $H^2$ suitably journaled in the frame. On the shaft $H^2$ is also mounted a bevel gear D which meshes with a gear E fixed upon the shaft G. The shaft $H^2$ is furthermore provided with a crank I to which is connected one end of a connecting arm J. Fixed to the frame are guide bars K′ whereon is slidably mounted a shifting frame K having the connecting arm J pivoted thereto. By means of this arrangement when the hand wheel is rotated the knife will be rotated and the shifting frame moved back and forth along the guide bars. Extending upward from the frame K is an arm $K^2$ whereon is supported guide bars $K^3$. These guide bars have securely fixed thereto a hopper side $L^2$ and from this hopper side project guide bars $K^4$ which are parallel and opposite to the bars $K^3$. Slidable on the guide bars $K^3$ and $K^4$ is a hopper side $L^4$ which carries the shafts $L^5$ whereon are mounted the sprockets R and S which are connected by a chain T having suitable provisions for forcing the bread downward to the knife. Slidable on the bars $K^4$ are certain sleeves $L^6$ through which extend the rods $L^7$ carrying a hopper side L′.

From the foregoing it will be obvious that the distance between the sides $L^2$ and $L^4$ may be varied by shifting the latter along the bars $K^3$ and $K^4$ while the side L′ may be adjusted relative to the sides $L^2$ and $L^4$ by shifting the sleeves $L^6$ along the bars $K^4$. The side L′ may also be adjusted relative to the side $L^3$, which is supported on the bracket $K^2$ by shifting the rods $L^7$ in the sleeves $L^6$.

20—20 are curved arms extending upwardly from the frame A and rigid therewith. Fixed in the ends of said arms is a rod 2 having a stop 5 fixed thereon. The lower shaft $L^5$ has a loose arm 21 mounted thereon which arm operates through a pawl and ratchet mechanism (not shown) to rotate the shaft $L^5$ by the engagement of the arm 21 with the stop 5 on the reciprocation of the hopper frame K.

In the frame K are mounted slotted guides 1 which receive the bolts 1′ carried by a rack bar N. This rack bar may thus be raised to the upper end of the slots or dropped to the lower end thereof at will. It is of course obvious that when raised it may be held in its raised position by a suitable tightening of the bolts.

Supported on the frame is a receptacle 4 which is adapted to contain butter and in this receptacle is a plunger 3 provided with a piston rod 3' carrying on its outer end a rack W which meshes with a pinion X supported on the shaft X' journaled to the frame A. Fixed on the shaft X' is a drum wheel U around which is wrapped a flexible strand U' having a weight V carried at its lower end. By means of this arrangement the piston or plunger 3 is constantly forced in the direction of the inner end of the casing 4 which end is open at the top as can be seen by reference to Fig. 3. Across this end of the casing extend parallel shafts Q which are journaled in the frame A and are connected by gears Q' and Q². On these shafts are the feed rollers O and P which serve to substantially close the opening at the end of the casing 4.

In the operation when it is desired to both cut and butter the bread the rack N is dropped until it meshes with a gear Q³ fixed upon one of the shafts Q. The hand wheel is then operated, the bread having been placed in the hopper and the walls of the latter properly adjusted. This causes reciprocation of the frame K and rotation of the knife B. The rollers O and P are also rotated. The bread is thus moved from off the table M against the edge of the knife and is buttered just prior to being cut by the knife. If it is not desired to butter the bread the rack N is raised and locked up.

What is claimed as new, is:—

In a machine for slicing and spreading loaf material, a cutting device arranged to be engaged by the loaf to slice the same, a reciprocating loaf carrier, a spreading mechanism over which the loaf in said carrier passes and coacting means on the carrier and spreading mechanism for selectively operating said mechanism and permitting the same to remain idle, said coacting means including a pinion on the spreading mechanism and a shiftable rack arranged for selective engagement with or freedom from this pinion.

In testimony whereof I affix my signature in presence of two witnesses.

WILLIAM BAGGULEY.

Witnesses:
JOHN LIDDLE,
JOHN TRAIN LIDDLE.

Copies of this patent may be obtained for five cents each, by addressing the "Commissioner of Patents, Washington, D. C."